United States Patent
Scoda

(10) Patent No.: US 9,473,592 B2
(45) Date of Patent: Oct. 18, 2016

(54) METHODS FOR OPTIMIZING A WEB CONTENT PROXY SERVER AND DEVICES THEREOF

(71) Applicant: Usablenet Inc., New York, NY (US)

(72) Inventor: Enrico Scoda, Martignacco (IT)

(73) Assignee: UsableNet Inc., New York, NY (US)

( * ) Notice: Subject to any disclaimer, the term of this patent is extended or adjusted under 35 U.S.C. 154(b) by 294 days.

(21) Appl. No.: 13/856,183

(22) Filed: Apr. 3, 2013

(65) Prior Publication Data

US 2013/0227004 A1    Aug. 29, 2013

Related U.S. Application Data

(63) Continuation-in-part of application No. 13/685,346, filed on Nov. 26, 2012, now Pat. No. 8,589,484, which is a continuation of application No. 12/660,637, filed on Mar. 2, 2010, now Pat. No. 8,321,502.

(51) Int. Cl.
*H04L 29/06* (2006.01)
*H04L 29/08* (2006.01)
*G06F 17/30* (2006.01)

(52) U.S. Cl.
CPC ......... *H04L 67/42* (2013.01); *G06F 17/30905* (2013.01); *H04L 65/105* (2013.01); *H04L 67/02* (2013.01); *H04L 67/2804* (2013.01); *H04L 67/2819* (2013.01)

(58) Field of Classification Search
CPC .................................................. H04L 67/1021
See application file for complete search history.

(56) References Cited

U.S. PATENT DOCUMENTS

| 7,954,144 B1 | 5/2011 | Ebrahimi et al. | |
| 2001/0054020 A1 | 12/2001 | Barth et al. | |
| 2003/0188016 A1* | 10/2003 | Agarwalla et al. | 709/241 |
| 2004/0015580 A1* | 1/2004 | Lu et al. | 709/224 |
| 2004/0039822 A1 | 2/2004 | Bensimone | |
| 2004/0044768 A1* | 3/2004 | Takahashi | 709/225 |
| 2009/0106349 A1 | 4/2009 | Harris | |
| 2010/0071052 A1 | 3/2010 | Mao et al. | |

FOREIGN PATENT DOCUMENTS

WO    WO0223375 A2    3/2002

OTHER PUBLICATIONS

International Search Report for European Patent Application No. 11156548.5, May 20, 2011.

* cited by examiner

*Primary Examiner* — Frantz Jean
*Assistant Examiner* — Anthony Rotolo
(74) *Attorney, Agent, or Firm* — LeClairRyan, a Professional Corporation

(57) ABSTRACT

A method, non-transitory computer readable medium, and apparatus that includes obtaining content with an original server cookie comprising a name and a value in response to a client request. Whether the value includes one or more of an established set of characters is determined. A new value is generated based on the value of the original server cookie and a URL encoding of the one or more of the established set of characters and any percent characters included in the value of the original server cookie prefixed by a first indicator character, when it is determined that the value includes one or more of the established set of characters. A web optimized client cookie comprising the new value and the name of the original server cookie concatenated with a domain attribute and path attribute associated with the content is generated. The web optimized client cookie is provided to the client.

27 Claims, 4 Drawing Sheets

```
GET /A.html HTTP/1.1
Host: www.example.com
Accept: */*
User-Agent: my-mobile-browser 1.0
```

*FIG. 2A*

```
HTTP/1.1 200 OK
Content-Type: text/html; charset=UTF-8
Content-Length: 5300
Set-Cookie: SESSION=1234; domain=.example.com; path=/
```

*FIG. 2B*

```
HTTP/1.1 200 OK
Content-Type: text/html; charset=UTF-8
Content-Length: 5300
Set-Cookie: SESSION+.example.com+/=n1234; path=mt/
```

*FIG. 2C*

```
GET /mt/www.example.com/B.html HTTP/1.1
User-Agent: my-mobile-browser 1.0
Host: m.proxy.com
Accept: */*
Cookie: SESSION+.example.com+/=n1234
```

*FIG. 2D*

```
GET /B.html HTTP/1.1
User-Agent: my-mobile-browser 1.0
Host: www.example.com
Accept: */*
Cookie: SESSION=1234
```

*FIG. 2E*

METHODS FOR OPTIMIZING A WEB CONTENT PROXY SERVER AND DEVICES THEREOF

This application is a continuation-in-part of U.S. patent application Ser. No. 13/685,346, filed on Nov. 26, 2012, which is a continuation of U.S. patent application Ser. No. 12/660,637, filed on Mar. 2, 2010, now U.S. Pat. No. 8,321,502, each of which is hereby incorporated by reference in its entirety.

FIELD

This invention generally relates to proxy servers and, more particularly, methods for optimizing web content proxy servers and apparatuses thereof.

BACKGROUND

A web content proxy server optimizes web pages obtained from remote web servers for client devices with special requirements, such as mobile phones, PDAs, and smartphones. Every time a client device requests a web page, the web content proxy server downloads the original page from a remote web server, applies some customized rules to extract relevant content, and adapts it to fit the needs of the requesting client device. By way of example, the web content proxy server may remove JavaScript, linearize content, and adapt the original page to a smaller screen layout for the requesting client device.

In computing, a cookie, such as a tracking cookie, browser cookie, and HTTP cookie, is a small piece of text stored by a web browser on the client device. A cookie includes one or more name-value pairs containing data, such as user preferences, shopping cart contents, the identifier for a server-based session, or other data used by websites.

Web content proxy servers need to save cookies to enable the client devices to interact with the original website at the remote web servers in the correct way. Accordingly, web content proxy servers store these cookies in an internal memory and associate them with the corresponding session from each client device so that when the same client device sends a request for a new page, the web content proxy server will load the matching cookies and send them to the remote web server to get the page to process. Unfortunately, storing the cookies for these client devices causes problems with scalability, security, and privacy of the web content proxy servers.

SUMMARY

A method for optimizing a web content proxy server includes obtaining at a web content proxy server content with an original server cookie comprising at least a name and a value from a content server in response to a request from a client device for the content. A determination is made whether the value of the original server cookie includes one or more of an established set of characters at the web content proxy server. A new value is generated at the web content proxy server based on the value of the original server cookie and a uniform resource locator (URL) encoding of at least the one or more of the established set of characters and any percent characters included in the value of the original server cookie prefixed by a first indicator character, when the determination indicates the value of the original server cookie includes one or more of the established set of characters. A web optimized client cookie including the new value and a new name with at least the name of the original server cookie concatenated with at least a portion of a domain attribute and a path attribute associated with the obtained content is generated at the web content proxy server. At least the web optimized client cookie is provided by the web content proxy server to the requesting client device.

A non-transitory computer readable medium having stored thereon instructions for optimizing a web content proxy server comprising machine executable code which when executed by a processor, causes the processor to perform steps including obtaining content with an original server cookie comprising at least a name and a value from a content server in response to a request from a client device for the content. A determination is made whether the value of the original server cookie includes one or more of an established set of characters. A new value is generated based on the value of the original server cookie and a uniform resource locator (URL) encoding of at least the one or more of the established set of characters and any percent characters included in the value of the original server cookie prefixed by a first indicator character, when the determination indicates the value of the original server cookie includes one or more of the established set of characters. A web optimized client cookie including the new value and a new name with at least the name of the original server cookie concatenated with at least a portion of a domain attribute and a path attribute associated with the obtained content is generated. At least the web optimized client cookie is provided to the requesting client device.

A web content proxy server apparatus, comprising a memory and a processor coupled to the memory and configured to execute programmed instructions stored in the memory including obtaining content with an original server cookie comprising at least a name and a value from a content server in response to a request from a client device for the content. A determination is made whether the value of the original server cookie includes one or more of an established set of characters. A new value is generated based on the value of the original server cookie and a uniform resource locator (URL) encoding of at least the one or more of the established set of characters and any percent characters included in the value of the original server cookie prefixed by a first indicator character, when the determination indicates the value of the original server cookie includes one or more of the established set of characters. A web optimized client cookie including the new value and a new name with at least the name of the original server cookie concatenated with at least a portion of a domain attribute and a path attribute associated with the obtained content is generated. At least the web optimized client cookie is provided to the requesting client device.

This technology provides a number of advantages including providing a method, non-transitory computer readable medium and an apparatus that optimizes implementation of a web content proxy server for interactions involving cookies between client devices and remote web servers. With this technology, original server cookies are transformed by the web content proxy server to web optimized client cookies which are transmitted to the client devices requesting the web pages for storage and use with subsequent requests.

This technology provides greater scalability because the web optimized client cookies are stored in the web browser at the client device, not in memory at the web content proxy server. As a result, the web content proxy server does not face any issues with respect to memory storage capacity due to the number of sessions with cookies for client devices.

The web content proxy server can use the same memory whether there are 100 or 1,000,000 or more client devices engaged in sessions with the remote web servers through the web content proxy server.

Additionally, this technology provides greater security and privacy because the web content proxy server does not contain a centralized database of original server cookies which contain session information from client devices browsing pages of web sites. Instead, these original server cookies are translated into web optimized client cookies which are then dispersed out among the client devices. As a result, the web content proxy server does not have any stored cookies from interactions between client devices and remote web servers that could be used to steal identity or other confidential information of these client devices.

BRIEF DESCRIPTION OF THE DRAWINGS

FIG. 2A is an example of a HTTP request for a web page from a remote web server;

FIG. 2B is an example of a HTTP response with an original server cookie from a remote web server to a HTTP request;

FIG. 2C is an example of a HTTP response containing the web optimized client cookie generated from the original server cookie received shown in FIG. 2B;

FIG. 2D is an example of another HTTP request with the web optimized client cookie shown in FIG. 2C for a web page from a remote web server.

FIG. 2E is an example of the another HTTP request with the web optimized client cookie shown in FIG. 2D translated into the original server cookie for transmission to the remote web server with the another get request;

DETAILED DESCRIPTION

Figure 1:
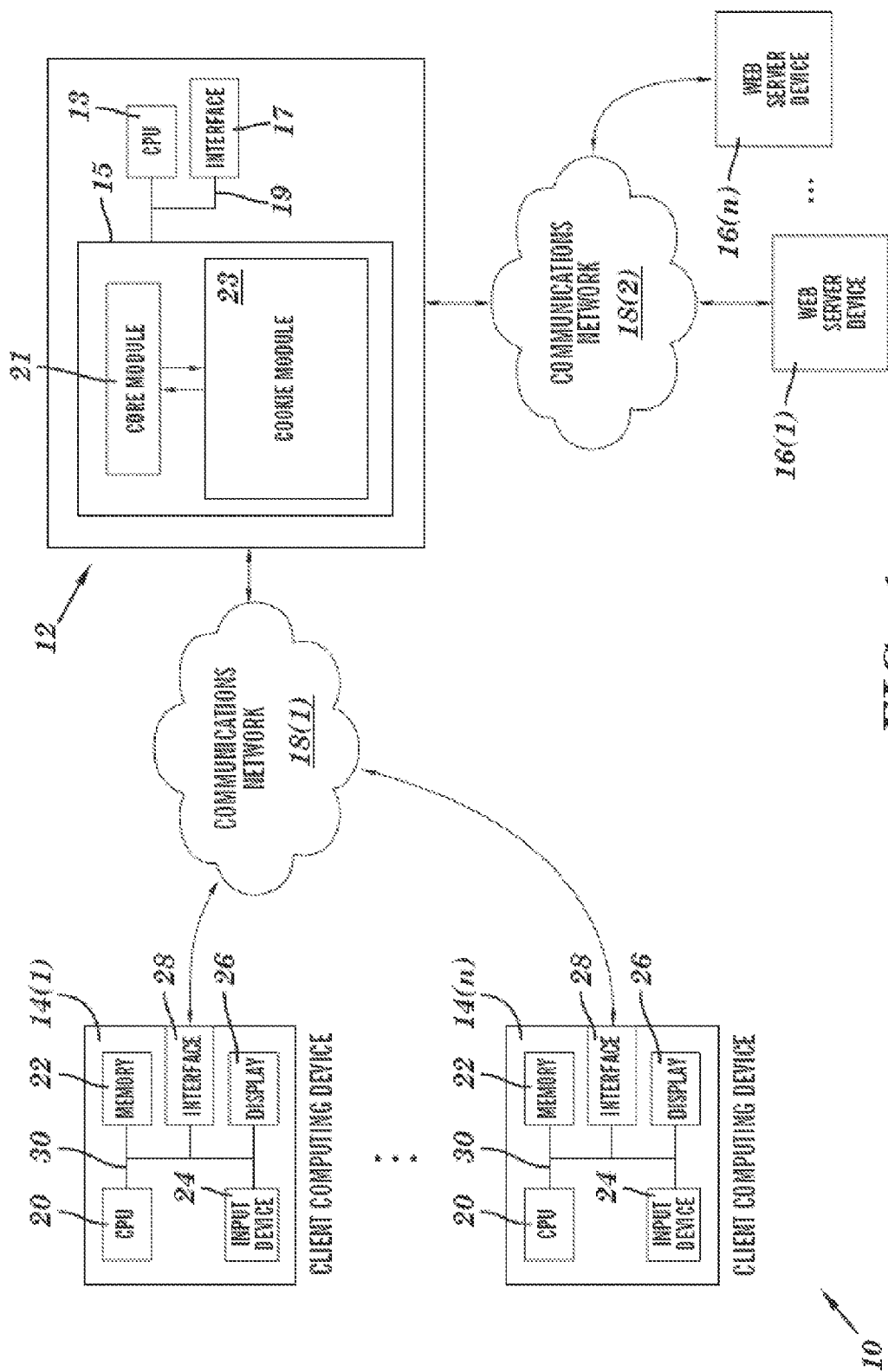
FIG. 1 is a block diagram of an exemplary environment with an optimized web content proxy server.
Figure 3:
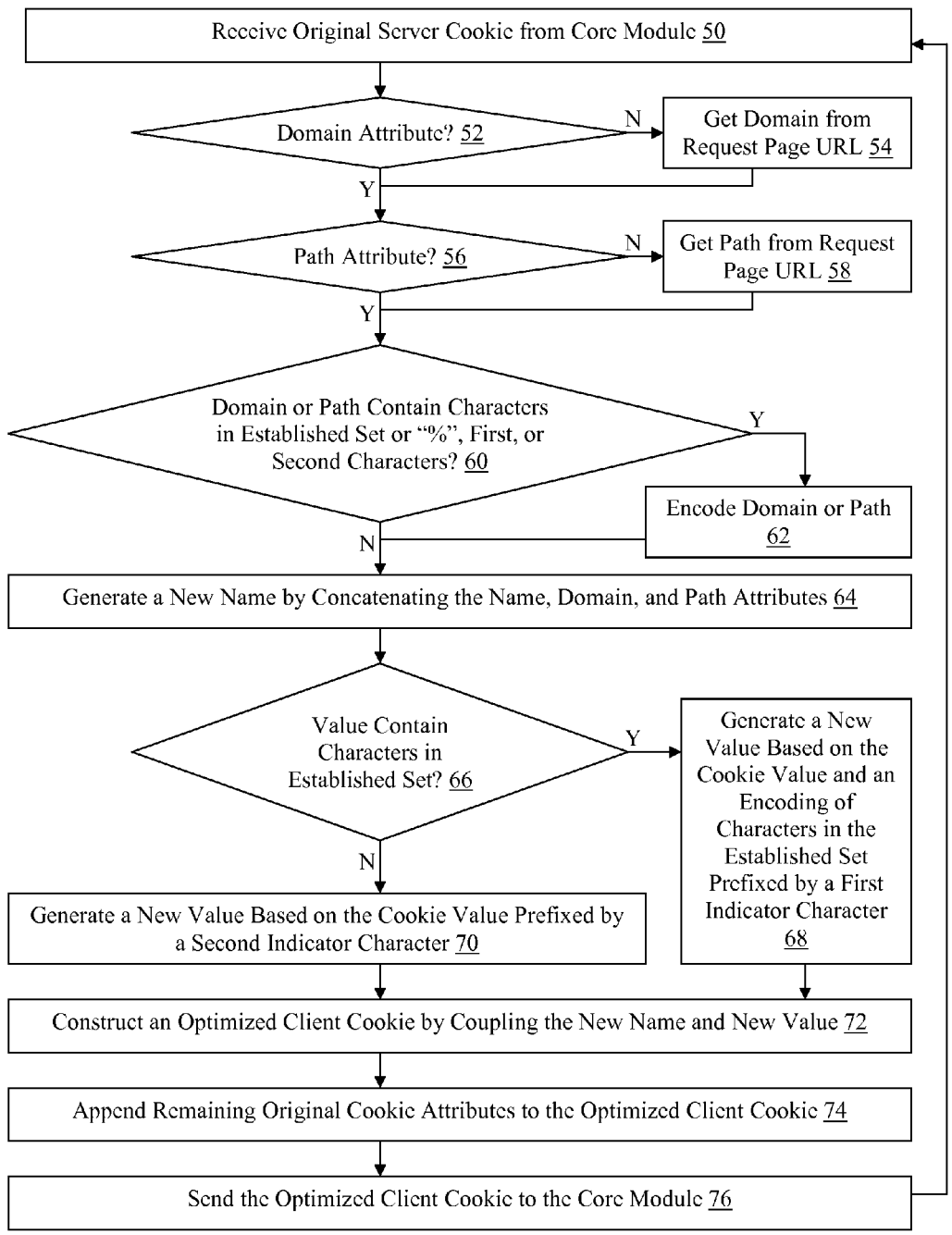
FIG. 3 is a flow chart of an example of a method for generating a web optimized client cookie from an original server cookie to optimize implementation of a web content proxy server.

An exemplary environment 10 in which a web content proxy server 12 is optimized is illustrated in FIG. 1. The exemplary environment 10 includes a web content proxy server or apparatus 12, client devices 14(1)-14(n), web server devices 16(1)-16(n), and communication networks 18(1)-18(2), although other numbers and types of systems, devices, and/or elements in other configurations and environments with other communication network topologies can be used. This technology provides a number of advantages including providing a method, computer readable medium and an apparatus that optimizes implementation of a web content proxy server for interactions involving cookies between client devices and remote web servers.

Referring more specifically to FIG. 1, the web content proxy server 12 optimizes the handling of original server cookies from the web server devices 16(1)-16(n) for requesting client devices 14(1)-14(n) and the handling of web optimized client cookies, although the web content proxy server 12 can provide other numbers and types of functions.

Although one web content proxy server 12 is shown, other numbers and types of web content proxy devices and systems can be used.

The web content proxy server 12 includes a central processing unit (CPU) or processor 13, a memory 15, and an interface system 17 which are coupled together by a bus 19 or other link, although other numbers and types of components, parts, devices, systems, and elements in other configurations and locations can be used. The processor 13 in the web content proxy server 12 executes a program of stored instructions one or more aspects of the present invention as described and illustrated by way of the embodiments herein, although the processor could execute other numbers and types of programmed instructions.

The memory 15 in the web content proxy server 12 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 13, can be used for the memory 15 in the web content proxy server 12. In these embodiments, the memory 15 includes a core module 21 and a cookie module 23 which store programmed instructions for one or more aspects of the present invention as described and illustrated herein, although the memory can comprise other types and numbers of systems, devices, and elements in other configurations which store other data. The cookie module 23 includes programmed instructions and/or logic configured to translate an original server cookie into a web optimized client cookie and to extract the original server cookie when a web optimized client cookie is received, although the cookie module 23 can have other types and numbers of functions as described and illustrated herein.

The interface system 17 in the web content proxy server 12 is used to operatively couple and communicate between the web content proxy server 12 and the client devices 14(1)-14(n) and the web server devices 16(1)-16(n) via the communication networks 18(1) and 18(2), although other types and numbers of communication networks with other types and numbers of connections and configurations can be used. By way of example only, the communication networks 18(1) and 18(2) can use TCP/IP over Ethernet and industry-standard protocols, including HTTP, HTTPS, WAP, and SOAP, although other types and numbers of communication networks, such as a direct connection, a local area network, a wide area network, modems and phone lines, e-mail, and wireless and hardwire communication technology, each having their own communications protocols, can be used.

Each of the client devices 14(1)-14(n) enables a user to request, get and interact with web pages from one or more web sites hosted by the web server devices 16(1)-16(n) through the web content proxy server 12 via one or more communication networks, although one or more of the client devices 14(1)-14(n) could access content and utilize other types and numbers of applications from other sources and could provide a wide variety of other functions for the user. Although multiple client devices 14(1)-14(n) are shown, other numbers and types of user computing systems could be used. In this example, the client devices 14(1)-14(n) comprise mobile devices with Internet access that permit a website form page or other retrieved data to be displayed, although each of the client devices 14(1)-14(n). By way of example only, one or more of the client devices 14(1)-14(n) can comprise smart phones, personal digital assistants, or computers.

Each of client devices 14(1)-14(n) in this example is a computing device that includes a central processing unit (CPU) or processor 20, a memory 22, user input device 24, a display 26, and an interface system 28, and which are coupled together by a bus 30 or other link, although one or more of client devices 14(1)-14(n) can include other numbers and types of components, parts, devices, systems, and elements in other configurations. The processor 20 in each of client devices 14(1)-14(n) executes a program of stored instructions for one or more aspects of the present invention as described and illustrated herein, although the processor could execute other numbers and types of programmed instructions.

The memory 22 in each of the client devices 14(1)-14(n) stores these programmed instructions for one or more aspects of the present invention as described and illustrated herein as well as the web optimized client cookies, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to processor 20 can be used for the memory 22 in each of the client devices 14(1)-14(n.

The user input device 24 in each of the client devices 14(1)-14(n) is used to input selections, such as requests for a particular website form page or to enter data in fields of a form page, although the user input device could be used to input other types of data and interact with other elements. The user input device can include keypads, touch screens, and/or vocal input processing systems although other types and numbers of user input devices can be used.

The display 26 in each of the client devices 14(1)-14(n) is used to show data and information to the user, such as website page by way of example only. The display in each of the client devices 14(1)-14(n) is a phone screen display, although other types and numbers of displays could be used depending on the particular type of client device.

The interface system 28 in each of the client devices 14(1)-14(n) is used to operatively couple and communicate between the client devices 14(1)-14(n) and the web content proxy server 12 and web server devices 16(1)-16(n) over the communication networks 18(1) and 18(2), although other types and numbers of communication networks with other types and numbers of connections and configurations can be used.

The web server devices 16(1)-16(n) provide one or more pages from one or more web sites for use by one or more of the client devices 14(1)-14(n) via the web content proxy server 12, although the web server devices 16(1)-16(n) can provide other numbers and types of applications and/or content and can have provide other numbers and types of functions. Although web server devices 16(1)-16(n) are shown for ease of illustration and discussion, other numbers and types of web server systems and devices can be used.

Each of the web server devices 16(1)-16(n) include a central processing unit (CPU) or processor, a memory, and an interface system which are coupled together by a bus or other link, although each of the web server devices 16(1)-16(n) could have other numbers and types of components, parts, devices, systems, and elements in other configurations and locations can be used. The processor in each of the web server devices 16(1)-16(n) executes a program of stored instructions one or more aspects of the present invention as described and illustrated by way of the embodiments herein, although the processor could execute other numbers and types of programmed instructions.

The memory in each of the web server devices 16(1)-16(n) stores these programmed instructions for one or more aspects of the present invention as described and illustrated by way of the embodiments, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the web server devices 16(1)-16(n).

The interface system in each of the web server devices 16(1)-16(n) is used to operatively couple and communicate between the web server devices 16(1)-16(n) and the web content proxy server 12 and the client devices 14(1)-14(n) via communication networks 18(1) and 18(2), although other types and numbers of communication networks with other types and numbers of connections and configurations can be used.

Although embodiments of the web content proxy server 12, the client devices 14(1)-14(n), and the web server devices 16(1)-16(n), are described and illustrated herein, each of the client devices 14(1)-14(n), the web content proxy server 12, and the web server devices 16(1)-16(n), can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

An exemplary method for generating a web optimized client cookie from an original server cookie to optimize implementation of the web content proxy server 12 will now be described with reference to FIGS. 1-2C and 3. In step 50, in this example one of the client devices 14(1)-14(n) via a web browser requests a page A.html at the website, "www.example.com" as shown in one example in FIG. 2A. This request is transmitted to the web content proxy server 12 which processes and transmits the request to the one of the web servers 16(1)-16(n) hosting the website "www.example.com."

The hosting one of the web servers 16(1)-16(n) provides a response in this example for the requested page A.html which also contains an original server cookie "SESSION" to the web content proxy server 12 as shown in FIG. 2B. In this example, SESSION has a value equal to "1234", the domain attribute is equal to ".example.com" and the path attribute is equal to "/". This response uses the HTTP header Field "Set-Cookie". The cookie is a string formed by the pair "name=value", followed by optional attributes, like those in this example indicating the server domain attribute and path attribute accepting this cookie. Although one illustrative example is described herein, this technology can be used with specifications for all cookies.

Next, in step 52 the web content proxy server 12 determines whether the original server cookie includes the domain attribute for the requested web page provided by the hosting one of the web servers 16(1)-16(n). If in step 52 the web content proxy server 12 determines the original server cookie does not include the domain attribute, then the No branch is taken to step 54. In step 54, the web content proxy server 12 extracts the domain attribute from the requested web page provided by the hosting one of the web servers 16(1)-16(n). If in step 52 the web content proxy server 12 determines the original server cookie does include the domain attribute, then the Yes branch is taken to step 56.

In step 56, the web content proxy server 12 determines whether the original server cookie includes the path attribute for the requested web page provided by the hosting one of the web servers 16(1)-16(n). If in step 56 the web content proxy server 12 determines the original server cookie does not include the path attribute, then the No branch is taken to step 58. In step 58, the web content proxy server 12 extracts the path attribute from the requested web page provided by the hosting one of the web servers 16(1)-16(n). If in step 56 the web content proxy server 12 determines the original server cookie does include the path attribute, then the Yes branch is taken to step 60.

In step 60, the web content proxy server 12 determines whether the domain attribute or the path attribute contains any characters in an established set or a percent, a first, or a second character. In this example, the established set of characters includes a control character, a double quote character, a space character, a comma character, a semicolon character, a backslash character, or one or more reserved characters identified in Request for Comment No. 6265 ("RFC6265"). In this example, the first character is a plus sign character and the second character is an equal sign character, although other characters can also be used in the established set or as the first or second character.

If the web content proxy server 12 determines that the domain attribute or the path attribute associated with the content contains any characters in the established set or a percent, a first, or a second character, then the Yes branch is taken to step 62. In step 62, the web content proxy server 12 generates a new domain attribute and/or a new path attribute by performing a uniform resource locator (URL) encoding of any characters in the established set and any percent, first, or second characters in the domain attribute and/or path attribute. Since the domain attribute and path attribute in this example are incorporated into a name of a web optimized client cookie, as described and illustrated in more detail below, the domain attribute and path attribute must be converted to conform to cookie name specifications set forth in RFC6265.

Additionally, the plus sign character is used to separate the name of the original server cookie from a domain attribute and a path attribute in a new name for the web optimized client cookie, as described and illustrated in detail below. The equal sign character is used to separate the new name from a new value in the web optimized client cookie, also as described and illustrated in detail below. Other characters can also be used as separators and corresponding first and second characters. Since, in this example, some character(s) of the domain attribute and/or the path attribute may be URL encoded, instances of the percent character in the domain attribute and path attribute must also be URL encoded to distinguish instances of the percent character from a percent character introduced by a URL encoding of another character in the domain attribute or path attribute.

Subsequent to the encoding in step 62 or, if the web content proxy server 12 determines, in step 60, that the domain attribute and path attributes associated with the content do not contain any characters in the established set or any percent, first, or second characters, and the No branch is taken, the web content proxy server 12 generates a name for a new web optimized client cookie in step 64. The web content proxy server 12 generates the name for the new web optimized client cookie by concatenating the original name and the original domain attribute and/or the path attribute, or the new domain attribute and/or the new path attribute generated in step 62, each separated by the plus character, although other manners for generating the new name can be used.

Figure 4:
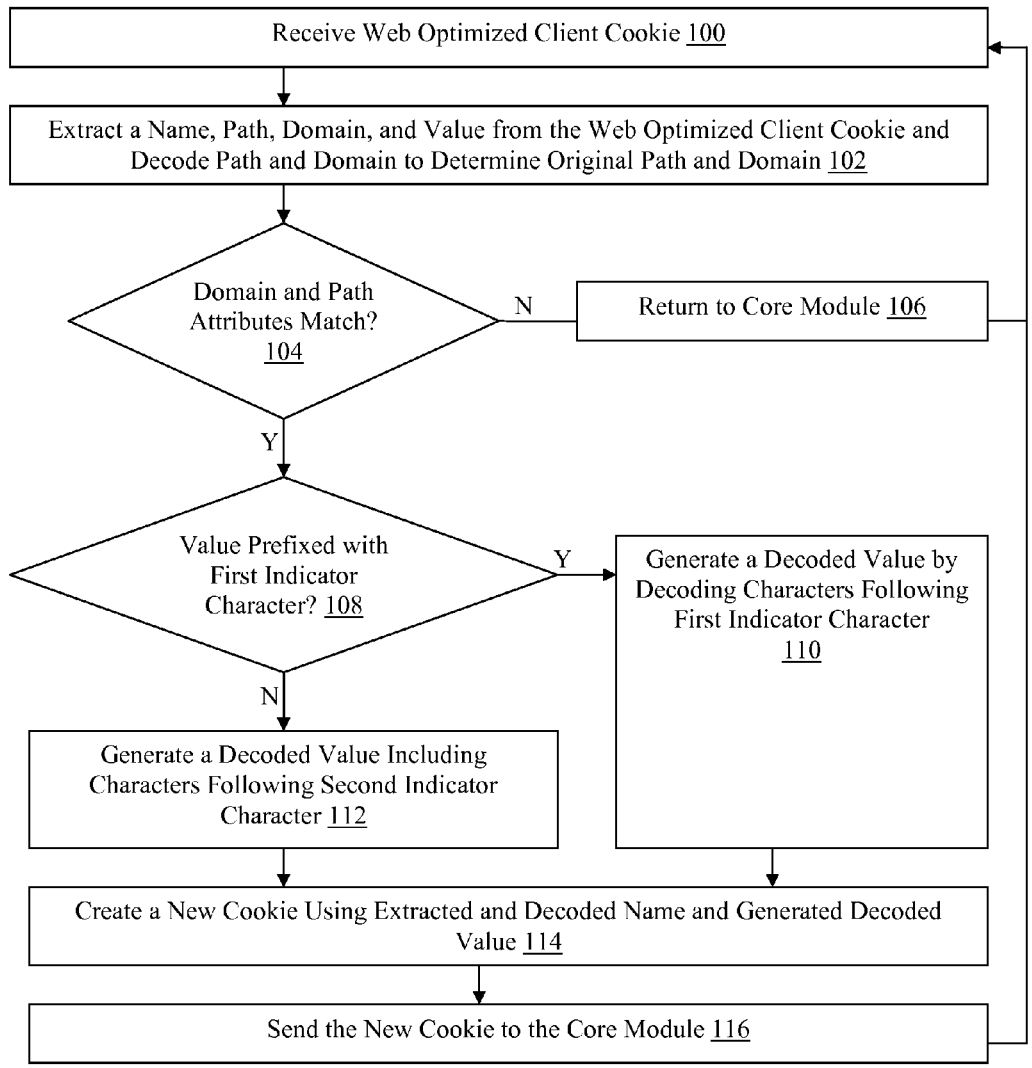
FIG. 4 is a flow chart of an example of a method for transforming a web optimized client cookie back to an original server cookie to optimize implementation of a web content proxy server.

The resulting new name is "universal resource locator encoded" to keep conformance to the cookie specification. Additionally, the resulting new name is unique even if different domain attributes contain cookies with the same name. This new name contains all the information necessary for the web content proxy server 12 to extract the original server cookie later, as described in greater detail by reference to FIG. 4.

In step 66, the web content proxy server 12 determines whether the value of the original server cookie includes one or more of an established set of characters. Optionally, the established set of characters is the same set of characters used in step 60, although a different set of characters can also be used. If the web content proxy server 12 determines that the value of the original server cookie includes one or more of the established set of characters, then the Yes branch is taken to step 68.

In step 68, the web content proxy server generates a new value based on the value of the original server cookie and a URL encoding of any characters included in the established set of characters, as well as any percent characters. Since the new value must comply with RFC 6265 but it is not guaranteed that original server cookie value is compliant, the original sever cookie value must be converted to comply with cookie-octet specifications Additionally, instances of the percent character in the value must also be URL encoded to distinguish the instances with a percent character introduced by a URL encoding of another character in the value. In this example, the generated new value is further prefixed by a first indicator character such as "e" in this example, although other characters can be used for the first indicator character.

Referring back to step 66, if the web content proxy server 12 determines that the value of the original server cookie does not include any of the established set of characters, then the No branch is taken to step 70. In step 70, the web content proxy server 12 optionally generates a new value based on the value of the original server cookie prefixed by a second indicator character such as "n" in this example, although other characters can be used for the second indicator character. In other examples, the first indicator character is used to determine whether the value has been encoded, as described and illustrated in greater detail with reference to FIG. 4, and a second indicator character is not used.

In step 72, the web content proxy server 12 forms a new web optimized client cookie having the new name generated in step 64 and new value generated in step 68 or step 70. In this example, the domain attribute in the web optimized client cookie is not specified, and the path attribute is associated with a value "/". Other values can be used, such as one for the path attribute that corresponds to a prefix associated with this optimization method (by way of example only "/mt/").

By way of example only, when the web content proxy server 12 receives a response with the original server cookie as shown in FIG. 2B, the web content proxy server 12 generates a web optimized client cookie as shown in FIG. 2C. More specifically, the original server cookie: SESSION=1234; domain attribute=.example.com; and path attribute=/is transformed by the web content proxy server 12 to a web optimized client cookie: SESSION+.example.com+/=n1234; path attribute=/mt/. Accordingly, in this illustrative example the new web optimized client cookie name represents the concatenation of the original server cookie name, original domain attribute, and original path attribute each separated by the plus sign character. Additionally, in this example, the new web optimized client cookie value represents the original server cookie value prefixed by an indicator character indicating whether the original server cookie value is encoded.

In this example, the original domain attribute and original path attribute are used because none of the characters of the original domain attribute and original path attribute were included in the established set of characters or matched the first or second characters (plus sign and equal sign, respectively, in this example). Other orders and manners for forming the name of the web optimized client cookie can also be used. In this example, the value of the web optimized client cookie is prefixed with an "n" character indicating that the value of the original server cookie did not include any characters in the established set of characters and, therefore, was not URL encoded. Additionally, in this example, the new path attribute corresponds to a prefix "/mt/" associated with this optimization method.

Next, in step 74 the web content proxy server 12 copies the remaining attributes in the original server cookie, such as an expiration date for the original server cookie by way of example, in the web optimized client cookie, although other amounts of the remaining attributes could be copied and other information also could be appended.

In step 76, the original server cookie which has been translated into the web optimized client cookie is now provided to the core module 21 in the web content proxy server 12. The core module 21 includes programmed instructions and/or logic to manage the transmission of the web optimized client cookie and the content from the web content proxy server 12 to the requesting one of the client devices 14(1)-14(n). The web browser at the requesting one of the client devices 14(1)-14(n) receives and saves the web optimized client cookie in the memory 22 at the requesting one of the client devices 14(1)-14(n).

Accordingly, in this illustrative example, the web optimized client cookie shown in FIG. 2C is stored in the memory 22 at the requesting one of the client devices 14(1)-14(n) and is not stored by the web content proxy server 12. While conformance with cookie name specifications could be maintained by URL encoding all characters, or all special characters, of the domain attribute, path attribute, and value of the original server cookie, in this example, only a limited number of characters are URL encoded, thereby reducing the size of the web optimized client cookie. By reducing the size of the web optimized client cookie, less space in the memory 22 of the requesting one of the client devices 14(1)-14(n) is utilized and the web optimized client cookie can be sent to the requesting one of the client devices 14(1)-14(n) in less time.

Referring now to FIGS. 1, 2D-2E, and 4, an exemplary method for translating a web optimized client cookie back to an original server cookie to optimize the implementation of the web content proxy server 12 will now be described. In step 100, in this example one of the client devices 14(1)-14(n) via a web browser submits another request to the web content proxy server 12 for page B.html at the website, "www.example.com" as shown in one example in FIG. 2D. This request includes a web optimized client cookie, which in this example comprises a name/value pair: SESSION+.example.com+/=n1234.

In step 102, the web content proxy server 12 extracts the original server cookie name and the encoded domain attribute and path attributes from the name of the web optimized client cookie. In this illustrative example, the original server cookie name and the domain attribute and path attributes are extracted by the web content proxy server from the name: SESSION+.example.com+/. The domain attribute can be extracted based on the characters following the first plus sign character separating the domain attribute from the original server cookie name and the path attribute can be extracted based on the characters following the second plus sign character separating the domain attribute from the path attribute. Additionally, the value can be extracted based on the characters of the web optimized client cookie following the equal sign character. The web content proxy server 12 further performs a URL decoding of the domain attribute and path attributes. In this example, no characters of the domain attribute and path attribute were encoded in step 62 and the extracted domain attribute and path attribute represent the original domain attribute and path attributes as included in the original server cookie.

In step 104, the web content proxy server 12 determines whether the extracted domain attribute and path attribute identify a web optimized client cookie that is a match to a universal resource locator for the requested web page. If in step 104 the web content proxy server 12 determines the extracted domain attribute and path attributes identify a web optimized client cookie that is not a match, then the No branch is taken to step 106. In step 106, the web content proxy server 12 submits the request to the hosting one of the web servers 16(1)-16(n) hosting the request page without an original server cookie. In this illustrative example, the requested page is "B.html." If in step 104 the web content proxy server 12 determines the extracted domain attribute and path attributes identify a web optimized client cookie that is a match, then the Yes branch is taken to step 108.

In step 108, the web content proxy server 12 determines whether the web optimized client cookie included in the request received in step 100 includes a value, prefixed with the first indicator character or the second indicator character. If the web content proxy server 12 determines that the value of the web optimized client cookie is prefixed by the first indicator character, then the Yes branch is taken to step 110.

In step 110, the web content proxy server 12 generates a decoded value by performing a URL decoding of any characters following the first indicator character in the value of the web optimized client cookie extracted in step 102. Referring back to step 108, if the web content proxy server 12 determines that the value of the web optimized client cookie is prefixed by the second character, then the No branch is taken to step 112. In examples in which the second indicator is not used, and optional step 70 is not performed, the No branch is taken by web content proxy server 12 when the web content proxy sever 12 determines the extracted value is not prefixed by the first indicator character.

In step 112, the web content proxy server 12 generates a decoded value including the characters following the second indicator character in the value of the web optimized client cookie extracted in step 102. In examples in which the second indicator character is not used, the value of the web optimized client cookie extracted in step 102 is used as the decoded value. Since, in the example illustrated in FIG. 2D, the value n1234 is prefixed with an "n", the No branch is taken from step 108 and the decoded value generated in step 112 is 1234. Accordingly, one of the indicator characters is inserted by the web content proxy server 12 to indicate to the web content proxy server 12 whether the value included in a subsequent request including a web optimized client has been URL encoded, as described and illustrated earlier with reference to step 68.

In step 114, the web content proxy server 12 creates a new cookie by associating the name extracted from the web optimized client cookie in step 102 with the value for the original server cookie decoded in step 110 or 112. The extracted name and decoded value comprise the original server cookie which is appended to the HTTP cookie header fields of the request to be sent to the one of the web servers 16(1)-16(n) hosting the requested web page. In this illustrative example, the extracted name SESSION is associated with the value 1234.

In step 116, the web content proxy server 12 submits the request with the reconstituted original server cookie to the one of the web servers 16(1)-16(n) hosting the requested page. In this illustrative example, the request with the reconstituted original server cookie as shown in FIG. 2E is transmitted to the one of the web servers 16(1)-16(n) hosting the requested web page B.html.

Accordingly, as illustrated and described herein this technology provides a number of advantages including providing a method, computer readable medium and an apparatus that optimizes implementation of a web content proxy server for interactions involving cookies between client devices and remote web servers. With this technology, the web content proxy server is much more scalable because of the reduced memory storage demands and the web content proxy server poses a much lower security and privacy risk to information provided by the client devices 14(1)-14(n). Additionally, the size of the cookies, and associated time required to send cookies to client devices and storage requirements on the client devices, is advantageously reduced while conformance with cookie name specifications is maintained.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for optimizing a web content proxy server, the method comprising:
    obtaining by a web content proxy server content with an original server cookie comprising at least a name and a value from a content server in response to a request from a client device for the content;
    determining by the web content proxy server when the value of the original server cookie includes one or more of an established set of characters comprising at least one or more reserved characters;
    uniform resource locator (URL) encoding by the web content proxy server the one or more of the established set of characters and any percent characters included in the value of the original server cookie, when the determining indicates the value of the original server cookie includes the one or more of the established set of characters, wherein the value of the original server cookie is separate from a domain attribute associated with the content;
    generating by the web content proxy server a web optimized client cookie comprising a new value comprising the URL encoded value of the original server cookie prefixed by a first indicator character, wherein the new value of the web optimized client cookie is separate from a path attribute associated with the content;
    generating by the web content proxy a new name of the web optimizing client cookie comprising at least the name of the original server cookie concatenated with at least a portion of the domain attribute and the path attribute; and
    providing by the web content proxy server at least the web optimized client cookie to the requesting client device.

2. The method as set forth in claim 1, further comprising generating by the web content proxy server another new value comprising the value of the original server cookie prefixed by a second indicator character, wherein the second indicator character is different from the first indicator character, when the determining indicates that the value of the original server cookie does not include the one or more of the established set of characters.

3. The method as set forth in claim 1, further comprising:
    encoding by the web content proxy server any of the one or more of the established set of characters in the domain attribute or the path attribute associated with the content, wherein the established set of characters comprises a first character and a second character that is different from the first character and the domain attribute and the path attribute are separated in the web optimized client cookie by the first character and the new value and the new name are separated by the second character.

4. The method as set forth in claim 3, wherein the first character is a plus character and the second character is an equal character and the reserved characters comprise one or more of a control character, a double quote character, a space character, a comma character, a semicolon character, a backslash character, the plus character, the equal character, or one or more reserved characters identified in Request for Comment No. 6265.

5. The method as set forth in claim 1, further comprising:
determining by the web content proxy server when the original server cookie includes a domain attribute or a path attribute;
generating by the web content proxy server a new domain attribute or a new path attribute based on another domain attribute or another path attribute of a network address of the obtained content, when the determining indicates that the original server cookie does not include a domain attribute or a path attribute.

6. The method of claim 1, further comprising:
processing by the web content proxy server a subsequent request from the client device by reconstituting the original server cookie using a web optimized client cookie included in the subsequent request, the reconstituting comprising:
determining when the web optimized client cookie included in the subsequent request includes a value prefixed with the first indicator character; and
generating a URL decoding of a plurality of characters following the first indicator character included in the web optimized client cookie included in the subsequent request, when the determining indicates that the web optimized client cookie included in the subsequent request includes a value prefixed with the first indicator character.

7. The method as set forth in claim 6, wherein the processing further comprises:
determining when a domain attribute and a path attribute of the reconstituted original server cookie correspond with a network address of the subsequent request; and
providing the subsequent request with the reconstituted original server cookie to the content server, when the determining indicates that the domain attribute and the path attribute of the reconstituted original server cookie correspond with the network address of the subsequent request.

8. The method as set forth in claim 1, wherein the providing further comprises providing the obtained content and the web optimized client cookie to the client device without storing the original server cookie or the web optimized client cookie.

9. The method as set forth in claim 1, wherein the generating the web optimized client cookie further comprises appending one or more original attributes of the original server cookie to the web optimized client cookie.

10. A non-transitory computer readable medium having stored thereon instructions for optimizing a web content proxy server comprising machine executable code which when executed by a processor, causes the processor to perform steps comprising:
obtaining content with an original server cookie comprising at least a name and a value from a content server in response to a request from a client device for the content;
determining when the value of the original server cookie includes one or more of an established set of characters comprising at least one or more reserved characters;
uniform resource locator (URL) encoding the one or more of the established set of characters and any percent characters included in the value of the original server cookie, when the determining indicates the value of the original server cookie includes the one or more of the established set of characters, wherein the value of the original server cookie is separate from a domain attribute associated with the content;
generating a web optimized client cookie comprising a new value comprising the URL encoded value of the original server cookie prefixed by a first indicator character, wherein the new value of the web optimized client cookie is separate from a path attribute associated with the content;
generating a new name of the web optimizing client cookie comprising at least the name of the original server cookie concatenated with at least a portion of the domain attribute and the path attribute; and
providing at least the web optimized client cookie to the requesting client device.

11. The medium as set forth in claim 10, wherein the medium further has stored thereon instructions comprising machine executable code which when executed by at least one processor, causes the processor to perform steps further comprising generating another new value comprising the value of the original server cookie prefixed by a second indicator character, wherein the second indicator character is different from the first indicator character, when the determining indicates that the value of the original server cookie does not include the one or more of the established set of characters.

12. The medium as set forth in claim 10, wherein the medium further has stored thereon instructions comprising machine executable code which when executed by at least one processor, causes the processor to perform steps further comprising:
encoding any of the one or more of the established set of characters in the domain attribute or the path attribute associated with the content, wherein the established set of characters comprises a first character and a second character that is different from the first character and the domain attribute and the path attribute are separated in the web optimized client cookie by the first character and the new value and the new name are separated by the second character.

13. The medium as set forth in claim 10, wherein the medium further has stored thereon instructions comprising machine executable code which when executed by at least one processor, causes the processor to perform steps further comprising:
determining when the original server cookie includes a domain attribute or a path attribute;
generating a new domain attribute or a new path attribute based on another domain attribute or another path attribute of a network address of the obtained content, when the determining indicates that the original server cookie does not include a domain attribute or a path attribute.

14. The medium as set forth in claim 10, wherein the first character is a plus character and the second character is an equal character and the reserved characters comprise one or more of a control character, a double quote character, a space character, a comma character, a semicolon character, a backslash character, the plus character, the equal character, or one or more reserved characters identified in Request for Comment No. 6265.

15. The medium as set forth in claim 10, wherein the medium further has stored thereon instructions comprising machine executable code which when executed by at least one processor, causes the processor to perform steps further comprising:
processing a subsequent request from the client device by reconstituting the original server cookie using a web optimized client cookie included in the subsequent request, the reconstituting comprising:
determining when the web optimized client cookie included in the subsequent request includes a value prefixed with the first indicator character; and
generating a URL decoding of a plurality of characters following the first indicator character included in the web optimized client cookie included in the subsequent request, when the determining indicates that the web optimized client cookie included in the subsequent request includes a value prefixed with the first indicator character.

16. The medium as set forth in claim 15, wherein the processing further comprises:
determining when a domain attribute and a path attribute of the reconstituted original server cookie correspond with a network address of the subsequent request; and
providing the subsequent request with the reconstituted original server cookie to the content server, when the determining indicates that the domain attribute and the path attribute of the reconstituted original server cookie correspond with the network address of the subsequent request.

17. The medium as set forth in claim 10, wherein the providing further comprises providing the obtained content and the web optimized client cookie to the client device without storing the original server cookie or the web optimized client cookie.

18. The medium as set forth in claim 10, wherein the generating the web optimized client cookie further comprises appending one or more original attributes of the original server cookie to the web optimized client cookie.

19. A web content proxy server apparatus, comprising memory comprising programmed instructions stored in the memory and one or more processors which are configured to be capable of executing the programmed instructions stored in the memory to:
obtain content with an original server cookie comprising at least a name and a value from a content server in response to a request from a client device for the content;
determine when the value of the original server cookie includes one or more of an established set of characters comprising at least a plurality of reserved characters;
uniform resource locator (URL) encode the one or more of the established set of characters and any percent characters included in the value of the original server cookie, when the determining indicates the value of the original server cookie includes the one or more of the established set of characters, wherein the value of the original server cookie is separate from a domain attribute associated with the content;
generate a web optimized client cookie comprising a new value comprising the URL encoded value of the original server cookie prefixed by a first indicator character, wherein the new value of the web optimized client cookie is separate from a path attribute associated with the content;
generate a new name of the web optimizing client cookie comprising at least the name of the original server cookie concatenated with at least a portion of the domain attribute and the path attribute; and
provide at least the web optimized client cookie to the requesting client device.

20. The apparatus as set forth in claim 19, wherein the one or more processors are further configured to be capable of executing the programmed instructions stored in the memory to generate another new value comprising the value of the original server cookie prefixed by a second indicator character, wherein the second indicator character is different from the first indicator character, when the determining indicates that the value of the original server cookie does not include the one or more of the established set of characters.

21. The apparatus as set forth in claim 19, wherein the one or more processors are further configured to be capable of executing the programmed instructions stored in the memory to:
encode any of the one or more of the established set of characters in the domain attribute or the path attribute associated with the content, wherein the established set of characters comprises a first character and a second character that is different from the first character and the domain attribute and the path attribute are separated in the web optimized client cookie by the first character and the new value and the new name are separated by the second character.

22. The apparatus as set forth in claim 19, wherein the one or more processors are further configured to be capable of executing the programmed instructions stored in the memory to:
determine when the original server cookie includes a domain attribute or a path attribute;
generate a new domain attribute or a new path attribute based on another domain attribute or another path attribute of a network address of the obtained content, when the determining indicates that the original server cookie does not include a domain attribute or a path attribute.

23. The apparatus as set forth in claim 19, wherein the first character is a plus character and the second character is an equal character and the reserved characters comprise one or more of a control character, a double quote character, a space character, a comma character, a semicolon character, a backslash character, the plus character, the equal character, or one or more reserved characters identified in Request for Comment No. 6265.

24. The apparatus as set forth in claim 19, wherein the one or more processors are further configured to be capable of executing the programmed instructions stored in the memory to:
process a subsequent request from the client device by reconstituting the original server cookie using a web optimized client cookie included in the subsequent request, the reconstituting comprising:
determine when the web optimized client cookie included in the subsequent request includes a value prefixed with the first indicator character; and
generate a URL decoding of a plurality of characters following the first indicator character included in the web optimized client cookie included in the subsequent request, when the determining indicates that the web optimized client cookie included in the subsequent request includes a value prefixed with the first indicator character.

25. The apparatus as set forth in claim 24, wherein the one or more processors are further configured to be capable of executing the programmed instructions stored in the memory to:

determine when a domain attribute and a path attribute of the reconstituted original server cookie correspond with a network address of the subsequent request; and provide the subsequent request with the reconstituted original server cookie to the content server, when the determining indicates that the domain attribute and the path attribute of the reconstituted original server cookie correspond with the network address of the subsequent request.

26. The apparatus as set forth in claim 19, wherein the one or more processors are further configured to be capable of executing the programmed instructions stored in the memory to provide the obtained content and the web optimized client cookie to the client device without storing the original server cookie or the web optimized client cookie.

27. The apparatus as set forth in claim 19, wherein the one or more processors are further configured to be capable of executing the programmed instructions stored in the memory to generate the web optimized client cookie further comprises appending one or more original attributes of the original server cookie to the web optimized client cookie.

* * * * *